United States Patent
Chen

(10) Patent No.: US 10,088,819 B2
(45) Date of Patent: Oct. 2, 2018

(54) SYSTEMS AND METHODS OF PROPERTY SECURITY

(71) Applicant: David H. C. Chen, Palo Alto, CA (US)

(72) Inventor: David H. C. Chen, Palo Alto, CA (US)

( * ) Notice: Subject to any disclaimer, the term of this patent is extended or adjusted under 35 U.S.C. 154(b) by 0 days.

(21) Appl. No.: 14/671,719

(22) Filed: Mar. 27, 2015

(65) Prior Publication Data

US 2015/0205278 A1   Jul. 23, 2015

Related U.S. Application Data

(62) Division of application No. 13/069,706, filed on Mar. 23, 2011, now Pat. No. 9,056,212.

(60) Provisional application No. 61/317,407, filed on Mar. 25, 2010.

(51) Int. Cl.
| | |
|---|---|
| *G05B 15/02* | (2006.01) |
| *A62C 3/00* | (2006.01) |
| *H02J 13/00* | (2006.01) |
| *G08B 17/00* | (2006.01) |
| *G06N 99/00* | (2010.01) |
| *G08B 21/02* | (2006.01) |
| *G08B 25/14* | (2006.01) |
| *G08B 29/18* | (2006.01) |

(52) U.S. Cl.
CPC ............... *G05B 15/02* (2013.01); *A62C 3/00* (2013.01); *G06N 99/005* (2013.01); *G08B 17/00* (2013.01); *H02J 13/0086* (2013.01); *G08B 21/02* (2013.01); *G08B 25/14* (2013.01); *G08B 29/181* (2013.01)

(58) Field of Classification Search
None
See application file for complete search history.

(56) References Cited

U.S. PATENT DOCUMENTS

| | | | |
|---|---|---|---|
| 2004/0030531 A1* | 2/2004 | Miller | A61B 5/0002 702/182 |
| 2011/0106278 A1* | 5/2011 | Martin-Cocher | G06Q 10/06314 700/90 |

* cited by examiner

*Primary Examiner* — Ryan Jarrett
(74) *Attorney, Agent, or Firm* — Law Office of Dorian Cartwright; Dorian Cartwright

(57) ABSTRACT

Systems and devices for and methods of energy management, property security and fire hazard prevention are provided. The systems, devices and methods are able to be centralized, computerized, and expandable. The devices and systems are capable of automatically reducing energy consumptions and minimizing losses of property caused by fire, theft, and vandalism using monitoring sensors (e.g., occupancy sensors) and computer software and equipments.

14 Claims, 7 Drawing Sheets

SYSTEMS AND METHODS OF PROPERTY SECURITY

CROSS-REFERENCE TO RELATED APPLICATION(S)

Under 35 U.S.C. 120, this application is a Divisional application and claims priority to U.S. patent application Ser. No. 13/069,706, filed on Mar. 23, 2011, entitled "SYSTEMS AND METHODS OF PROPERTY SECURITY", which claims priority under 35 U.S.C. § 119(e) of the U.S. Provisional Patent Application Ser. No. 61/317,407, filed Mar. 25, 2010 and entitled "SYSTEMS, DEVICES, AND METHODS OF ENERGY MANAGEMENT AND PROPERTY SECURITY," all of which are hereby incorporated by reference in their entireties for all purposes.

FIELD OF THE INVENTION

The present invention relates to the field of energy and property management. More specifically, the present invention relates to monitoring and/or controlling energy saving and property safety using disclosed devices and methods.

BACKGROUND OF THE INVENTION

Unattended appliances, such as heating or cooking devices, are able to cause fire and/or others disasters. A typical appliance does not automatically shut off its power when the user is away or the appliance is unattended.

SUMMARY OF THE INVENTION

Systems and devices for and methods of energy management, property security and fire hazard prevention are provided herein. The systems, devices and methods disclosed herein are able to be centralized, computerized and expandable. In some embodiments, the devices and systems are capable of automatically reducing energy consumptions and green house gases emissions and minimizing losses of property due to fire, theft, and vandalism. In some other embodiments, the device, the system, and method include automatic systems, devices and methods for saving standby and operation powers, deterring nonusers, assisting authorities, as well as reducing and detecting fire or other security hazards. In some embodiments, the systems, devices and methods do not need to program a remote thermostat or other controllable devices. In some embodiments, the systems, the devices, and the method do not need to switch on and off an alarm or any other types of security devices.

In a first aspect, a method of fire hazard prevention comprises providing one or more occupancy sensors in a property electrically or communicatively coupled with a gateway processor, sensing an occupancy status of the property using the one or more occupancy sensors, and adjusting one or more appliances according to the occupancy status of the property. In some embodiments, the adjusting comprises disabling the one or more appliances when the occupancy status is negative. In other embodiments, the adjusting comprises enabling the one or more appliances when the occupancy status is positive. In some other embodiments, the method further comprises sensing one or more characteristics of a flame and actuating alarm when the one or more characteristics of the flame are sensed. In some embodiments, the method further comprises notifying an authority or a user when the one or more characteristics of the flame are sensed. In other embodiments, the notification comprises location related information. In other embodiments, the method further comprises setting up a timer to disable a fire hazard prevention function for a predetermined period. In some other embodiments, the method further comprises sensing battery voltage level of one or more battery-powered devices using a voltage sensor, wherein each of the one or more battery-powered devices contains a unique identifier, sending recurring low battery warnings with the unique identifier from the one or more battery-powered devices when detect a low battery condition, translating the identifier into user-understandable device information, and presenting the device information to the user. In some other embodiments, the method further comprises generating the unique identifier based on a device address on a network. In some embodiments, the adjusting comprises adjusting all of the appliances together when the occupancy status in the property changes. In other embodiments, the adjusting comprises adjusting each appliance individually when the occupancy status in the respective area of the appliance changes. In some other embodiments, the method further comprises recording a detection result of the one or more occupancy sensors. In some embodiments, the method further comprises backing up the detection result at a location away from the property. In other embodiments, the method further comprises adjusting a thermostat setting, an illumination level, or a combination thereof. In some other embodiments, the method further comprises sensing an environmental condition. In some embodiments, the environmental condition comprises an illumination level. In other embodiments, the method further comprises preventing frozenness of a water pipe by adjusting a thermostat setting to a predetermined temperature. In some other embodiments, the method further comprises profiling an environmental condition to generate a preference.

In a second aspect, a method of energy management and property security comprises sensing absence of a person in a property using one or more occupancy sensors, reducing energy supply to an appliance when sensing the absence of a person, and notifying a user, an authority, or both when sensing and judging presence of a nonuser. In some embodiments, judging presence of the nonuser comprises sensing a person at the property at a time defined as absence of a person and the person fails to enter correct password within a predetermined time period. In other embodiments, the method further comprises profiling the user's activities using machine learning to determine the time defined as absence of a person. In some other embodiments, the method further comprises requesting to enter a password. In some embodiments, the notifying comprises informing a physical address or a location. In other embodiments, the method further comprises sensing one or more characteristics of a flame and actuating alarm when the one or more characteristics of the flame are sensed.

In a third aspect, a system for energy management, property security, fire hazard prevention or fire hazard detection comprises a gateway processor, one or more occupancy sensors coupling with the gateway processor, and one or more load control devices to control one or more appliances coupled with the system. In some embodiments, the gateway processor consults with a computer-readable user schedule. In other embodiments, the system further comprises a portal website coupled with the gateway process to perform a scheduling task, a backup task, or a combination thereof. In some other embodiments, the system further comprises a firewall coupled with the gateway processor. In some embodiments, the system further comprises one or more sensors capable of sensing a characteristic of a flame.

In other embodiments, the system further comprises one or more sensors capable of sensing one or more environmental conditions. In some other embodiments, the one or more environmental conditions comprise an illumination level.

In a fourth aspect, a gateway processor comprises one or more central processor units (CPU), one or more transceivers electrically coupled with the CPU, and one or more computer-readable medium storing a user's schedule, a first set of computer instructions or programs profiling a user's activity and creating the schedule, a second set of computer instructions or programs associating a device with one or more occupancy sensors in accordance with physical locations of the one or more occupancy sensors, a third set of computer instructions or programs translating unique device identifier or designation into device name or location, a fourth set of computer instructions or programs profiling an environmental condition and generating a preference, or a combination thereof. In some embodiments, the gateway processor further comprises at least one occupancy sensor suitable to detect presence or absence of one or more persons. In other embodiments, the gateway processor further comprises a firewall. In some other embodiments, the gateway processor further comprises a user input/output interface. In some embodiments, the computer-readable medium stores a fifth set of computer instructions or programs to perform authority or user notifications. In other embodiments, the computer-readable medium further stores data received from the one or more occupancy sensors, data related to system activities, data of acceptable lowest temperature, information of deployed location, or a combination thereof. In other embodiments, the gateway processor further comprises a buzzer or beeper.

In a fifth aspect, a managed electric or electronic appliance comprises a load control element to control an amount of power delivered, wherein the load control element communicatively couples with a gateway processor and electrically couples with an AC power source and an electric or electronic load coupled with the load control element. In some embodiments, the electric or electronic load comprises a cooking or heating element. In other embodiments, the appliance further comprises a meter to measure the electricity consumed by the electrical or electronic load, a processor coupled with the meter to accumulate the electricity consumption data, and a computer-readable storage medium coupled with the processor to store the accumulated electricity consumption data.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Throughout this disclosure, the word "property" is used as a generic term to include any tangible or intangible, movable or unmovable object, place or facility. The word "user" is able to include an individual or a group of individuals, who have the rights to access, operate, employ, consume, transfer or exchange the property. The word "nonuser" is able to include an individual or a group of individuals, who do not have the rights to access, operate, employ, consume, transfer or exchange the property.

Throughout this disclosure, the word "internet" or "Internet" is used as a generic term to include any system interconnecting networks of computerized devices, including but not limited to the Wide Area Network based on TCP/IP and commonly known as "Internet" (with a capital "I"), Cellular or PCS systems based on radio communication technologies.

Throughout this disclosure, the term "local area network" or "LAN" includes a network connecting computerized devices within a limited area. A LAN is able to include either wired or wireless means to connect computerized devices. A LAN is able to include Home Area Network (HAN) where it is implied that the limited area includes a home.

Throughout this disclosure, the noun "schedule" includes a computer-readable data regarding a user's activities at various day, date or time. A schedule is able to be accessible through internet, recorded in a computing device on a LAN, created through profiling a user's activities using machine learning, other techniques, or any combinations thereof.

In some embodiments, the devices, the systems, and the methods are able to be used in residential, commercial, industrial or other properties. A residential deployment is given as an example in FIG. 1.

Figure 1:
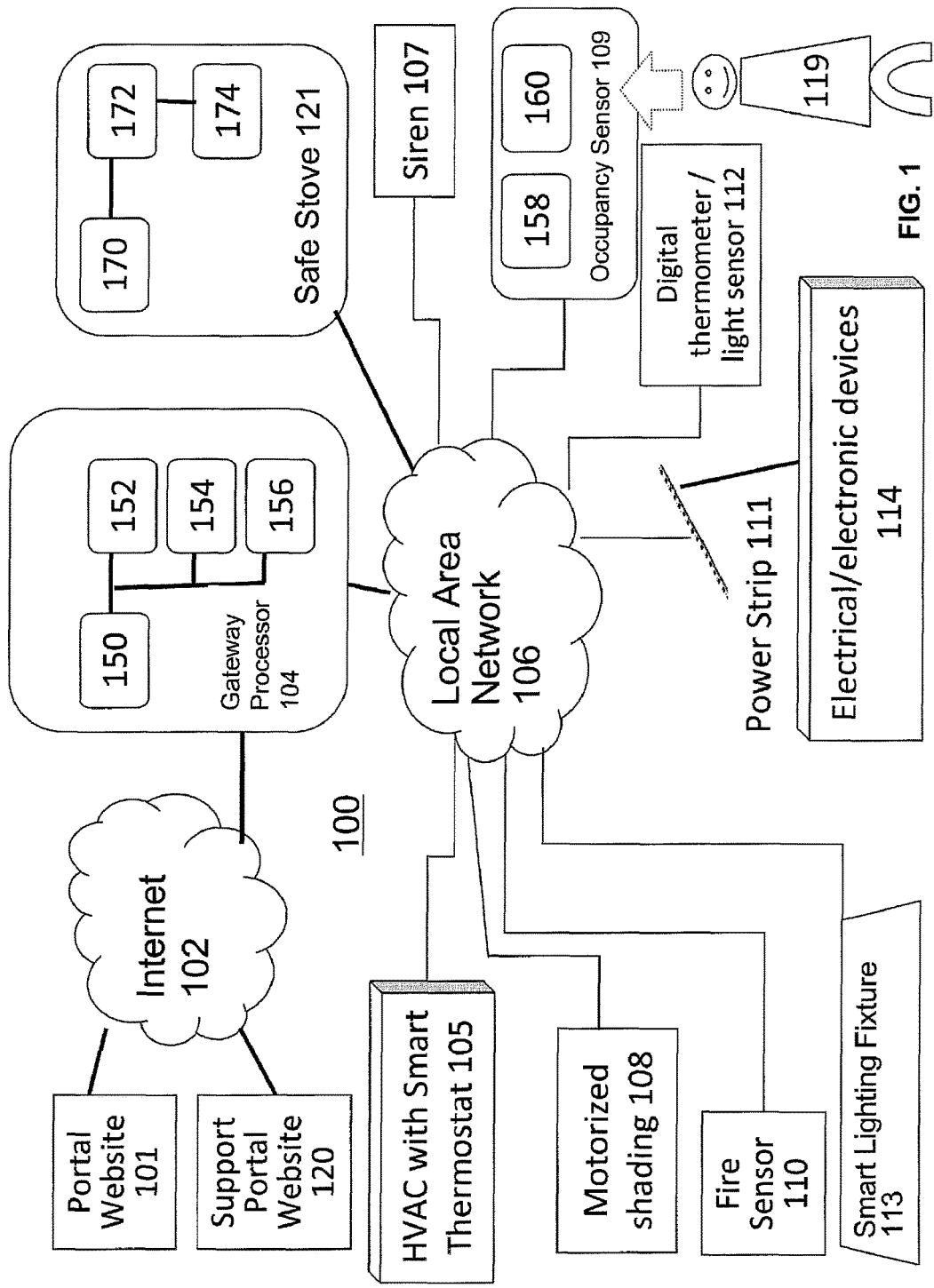
FIG. 1 illustrates a system for energy management, property security and fire hazard prevention according to some embodiments.

FIG. 1 shows a system 100 for energy management, property security and fire hazard prevention in accordance with some embodiments. In some embodiments, the system 100 includes a calendar/schedule portal website 101, which is configured to render or store a user calendar, a user's schedule data, or any other type of application or mechanism to track time or events and which is able to be coupled with the internet 102. In some embodiments, the system 100 includes a support portal website 120, which is configured to store offsite records, to support services, to create or host user webpage(s) and which is able to be coupled with the internet 102. The calendar/schedule portal website 101 and the support portal website 120 are able to be integrated as one website or are able to be separate websites. The system 100 is applicable to, but not limited by, the use of a calendar/schedule portal website 101, the use of a support portal website 120, or the integration thereof. A person of ordinary skill in the art will appreciate that the portal website 101, the support portal website 120, or a combination thereof is able to electronically/electrically/communicatively couple with a gateway processor 104 of the system 100.

In some embodiments, the system 100 comprises a gateway processor 104 comprising one or more transceivers 150, one or more storage media 152 (e.g., computer-readable medium, hard disk, and flash memory), and one or more central processor unit (CPU) 154. The gateway processor 104 is able to render or store additional computer-readable user calendar, schedule data, or any other type of application or mechanism to track time or events. In some embodiments, the gateway process 104 comprises the portal website 101, the support portal website 120, or a combination thereof.

The one or more transceivers 150 are able to perform uplink, downlink, or both communications. The uplink communication is able to communicate with the support portal website 120, the calendar/schedule portal website 101 or other internet-enabled devices. The downlink communication is able to communicate with other device(s) on one or more LAN(s) 106. The one or more storage media 152 are able to store instructions or computer programs, which are able to comprise an html locator link to a particular destination on the World Wide Web, user preferences and/or selections, default settings from pre-programming and/or profiling, event and/or sensor records, or any combinations thereof. The gateway processor 104 is also able to store the physical address or location (which is able to be defined by any type of locator information, such as longitude and latitude) wherein the system 100 is deployed.

The gateway processor 104 is able to be the only node bridging between or otherwise coupling the LAN 106 and devices out of the LAN 106. The gateway processor 104 is able to access the existing user calendar or schedule data from the calendar/schedule portal website 101. The gateway processor 104 is able to comprise a firewall 156 against unauthorized access to the LAN 106 by allowing only recognized communications from or to one or more predetermined communication ports. The gateway processor 104 is able to comprise a buzzer or beeper.

In some embodiments, the system 100 includes one or more occupancy sensors 109, as nodes of the LAN 106, responsive to motion, heat, sound, pressure, magnetism, vibration, substance, reflection or other physical stimulus associated with or caused by human bodies or human activities, to detect occupancy. The system 100 is able to utilize one or more sensors including infrared, ultrasonic, acoustic, optical, magnetic, chemical, thermo, seismic or a combination thereof. A person of ordinary skill in the art will appreciate that any other type of sensors are applicable so long as the sensing device is able to sense the occupancy of a predetermined and/or a random location.

In some embodiments, the occupancy sensor 109 is able to share the same housing with the gateway processor 104 or is able to be in another device on the LAN 106. In other embodiments, the occupancy sensor 109 is able to stand alone as a discrete device. In the embodiments that the occupancy sensor 109 is implemented as a standalone device, the occupancy sensor 109 is able to further comprise a transceiver 160 to facilitate communications on the LAN 106. In some embodiments, the occupancy sensor 109 comprises a transceiver 160 and sensor 158 to detect a person. In other embodiments, the occupancy sensor 109 comprises a transceiver 160 and sensor 158 configured to detect a person regardless of if the person is in standstill or in motion.

In some embodiments, the system 100 includes a digital fire sensor 110 to detect smoke, carbon monoxide or other substances from a flame. Smoke, carbon monoxide, and/or other substances from a flame are able to be characteristics of the flame. A person of ordinary skill in the art will appreciate that any physical conditions, chemical substances generated by a flame that are able to be detected/sensed are able to be the characteristics of the flame, such as heat, light, smoke, and electromagnetic emissions. The digital fire sensor 110 is able to serve as a node of the LAN 106. In some embodiments, the system 100 includes a digital thermometer and/or light sensor 112, which is able to serve as a node of the LAN 106.

In some embodiments, the system 100 includes a safe stove 121 comprising a heating or cooking element 174 (e.g., rice cooker), a load control element 172 and a transceiver 170, and which is able to be a node on the LAN 106. The load control element 172 is able to be electrically connected between an AC power source and the heating or cooking element 174. The load control element 172 is also able to electrically couple with the transceiver 170 to supply, withdraw, vary, limit, or regulate amount of power delivered to the heating or cooking element 174, in accordance with requests received through the transceiver 170. A person of ordinary skill in the art will appreciate that the load control element 172 is able to perform various controlling motions to the heating and/or cooking element 174. In some embodiments, the safe stove 121 further comprises a meter, a processor, and/or a computer-readable medium. The meter is able to measure the electricity consumed by coupled electrical or electronic load. The processor is able to accumulate the power consumption information over time. The computer-readable medium is able to store the accumulated power consumption data. However, a conventional stove and a separate device (e.g., a smart controller), which comprises a transceiver 170 and a load control element 172, are also able to function together as a safe stove 121. The system 100 is applicable to but not limited by either a standalone safe stove 121 or a stove coupled with a device comprising a transceiver 170 and a load control element 172.

In some embodiments, the system 100 integrates a transceiver 170 and a load control element 172 into any electrical or electronic device, where a safe stove 121 is part of an illustrative example. In other embodiments, the system 100 comprises a discrete smart controller comprising a transceiver 170 and a load control element 172. In some other embodiments, the system 100 comprises a discrete smart controller comprising a transceiver 170, a load control element 172, a meter, a processor and a computer-readable medium. A person of ordinary skill in the art will appreciate that there are multiple possible combinations and locations for the transceiver 170, electric or electronic load 174, load control element 172, any kind of meter, processor and computer-readable medium. All the possible combinations and locations are within the scope of some of the embodiments.

As a node on the LAN 106, the system 100 is able to comprise a power source 111 (such as managed power strip or managed wall outlet) including a transceiver, a load control element and one or more electrical outlet receptacles or sockets. The power source 111 is able to further comprise a meter, a processor, and a computer-readable medium. The meter is able to measure the electricity consumed by coupling with electrical or electronic devices 114. The processor 104 is able to accumulate the date or information of the power consumption over time. The computer-readable medium 152 is able to store the accumulated power consumption data.

In some embodiments, the power source 111 (e.g. managed power strip) is able to communicate with the gateway processor 104 and supply electricity to or withdraw (reduce) supply of electricity from the electrical outlet receptacles. In some embodiments, a set of electrical/electronic devices 114 (e.g., entertainment equipment) is plugged into the electrical outlet receptacles of the power source 111 (e.g., managed power strip) and is able to be controlled by the power source 111, according to the requests from the gateway processor 104.

In some embodiments, the system 100 includes a smart lighting fixture 113, which comprises a transceiver, a dimmer, and a lighting load. In some embodiments, the smart lighting fixture 113 is a node on the LAN 106. In other embodiments, a conventional lighting fixture and a separate device, which comprises a transceiver and a dimmer, are also able to function together as a smart lighting fixture 113. The system 100 is applicable to but not limited by either a standalone lighting fixture 113 or a lighting fixture coupled with a device comprising a transceiver and a dimmer. The separate device (e.g., smart dimmer) or smart lighting fixture 113 is able to further comprise a meter, a processor and a computer-readable medium. The meter is able to measure the electricity consumed by a coupled electrical or electronic load. The processor is able to be configured to accumulate the power consumption data/information over time. The computer-readable medium is able to store the accumulated power consumption data. The system 100 is applicable to but not limited by either a standalone smart lighting fixture 113 or a lighting fixture coupled with a smart dimmer.

In some embodiments, the system 100 includes a HVAC (Heating, Ventilating and/or Air Conditioning) coupled with smart thermostat 105, as a node on the LAN 106. In other embodiments, the system 100 includes a smart motorized shading 108 (such as blinds or drapery for windows), comprising a transceiver, a motor and a load controller, which is able to be another node on the LAN 106. A person of ordinary skill in the art will appreciate that any other devices (e.g., electrical devices, electronic devices, and mechanical devices) are able to be included in the system 100.

In some embodiments, the system 100 includes a smart siren 107 which is able to be a node on the LAN 106. The LAN 106 is able to be embodied with any wireless networks (such as ZIGBEE® and WI-FI®) and/or any wired networks (such as HOMEPLUG® and Ethernet). The network topology is able to be mesh, star or any other type of configuration. The LAN 106 is able to use a Smart Energy profile, other standards or proprietary applications. The system 100 is able to utilize but not be limited to a plurality of network protocols, topologies, standards or applications.

In some embodiments, the LAN 106 allows the nodes to send and receive data packets with each others, directly or having one or more intervening nodes to route the data packets. For clarity, the following illustrations will use arrows to represent the communications between nodes of the LAN 106 without showing the LAN 106 and the connectivity of the LAN 106.

The disclosure herein includes exemplary processes and methods of the present technology to provide a plurality of services to the user. While some embodiments are able to implement all or some of the following processes and methods, some other embodiments of the technology are able to implement additional processes and methods. Not all the exemplary processes and methods are required for the technology to function, and the user is able to configure the inventive system to provide only some of the functions. All components disclosed herein are optional. The technology is applicable but not limited to the automated pause, continuation, or expandability.

Figure 2:
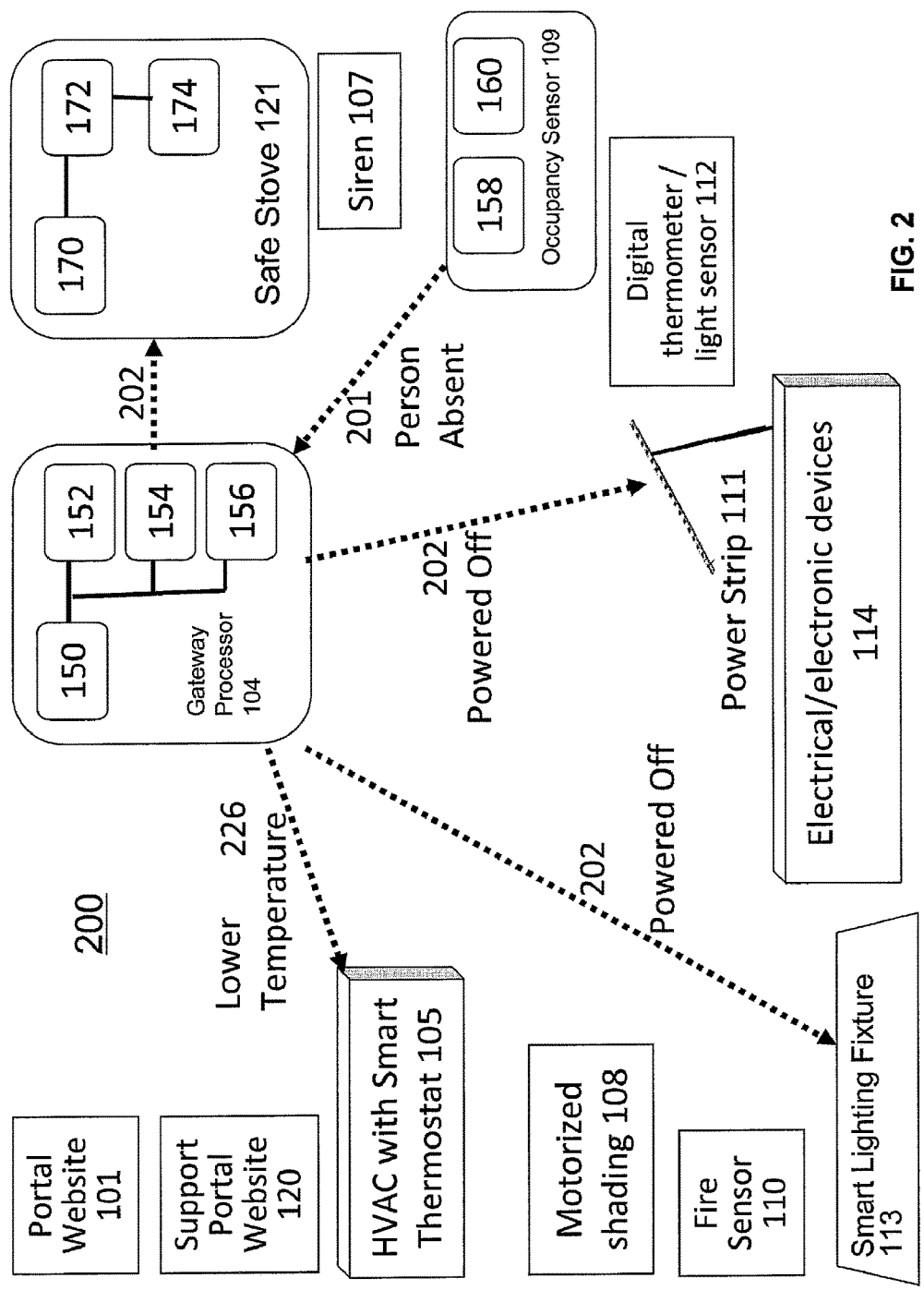
FIG. 2 illustrates a method of automatically reducing both standby and operation power consumptions and preventing fire hazards, when detecting the absence of a user, according to some embodiments.

FIG. 2 shows a method 200 to automatically reduce both standby and operation power consumptions in terms of electricity, natural gas or other energies, as well as to prevent fire hazards in accordance with some embodiments. In some embodiments, the method is referred as Off Method. When the user leaves a property, the occupancy sensor 109 is able to detect the absence of person and send a Person Absent message 201 to the gateway processor 104 immediately or after a predetermined time delay elapses. Immediately or after another predetermined time delay elapses, the gateway processor 104 is able to send a Power Off command 202 to the safe stove 121 and other devices. The sensed signal of the absence of the person in the property is able to be determined that the occupancy status is negative. The sensed signal of the presence of the person in the property is able to be determined that the occupancy status is positive. Upon receiving the Power Off command 202, the power source 111 is able to withdraw (reduce) electricity supply completely from the device 114. By doing so, a television (TV) and other entertainment equipment no longer consume standby powers, while the power source 111 itself is able to become only partially powered just enough to be able to respond to further communications with the gateway processor 104. Upon receiving the Power Off command 202, the smart lighting fixture 113 is able to withdraw the electricity from the light bulbs of the smart lighting fixture 113, in order to eliminate the operation power consumption, and is able to only supply limited power to the transceiver. Upon receiving the Power Off command 202, the safe stove 121 is able to withdraw electricity completely from the heating element, to avoid fire hazards caused by unattended cooking.

The gateway processor 104 is also able to send a predetermined low temperature setting to the smart thermostat 105, to adjust the heating setup to a lowest acceptable temperature just enough to prevent water pipes from freezing in order to minimize the natural gas consumption of the HVAC (part of 105). The smart thermostat (part of 105), upon receiving the lowered temperature setting 226, is able to adjust the heating setup accordingly.

The above "Off Method" is able to be completed in few seconds or less, to save both the standby and operation powers in electricity, natural gas or other energies, automatically, as well as to prevent fire hazards.

The user is able to elect to disable this process entirely, without impairing the functionality of the system 100. The user is able to elect to enable or disable this process for selected appliance or equipment. For example, the user is able to set up a timer to temporarily disable this process for the safe stove and/or to allow slow cooking to continue when the user is away. After the predetermined time delay elapses, this process is able to automatically restart to save energies and to prevent fire hazards.

Figure 3:
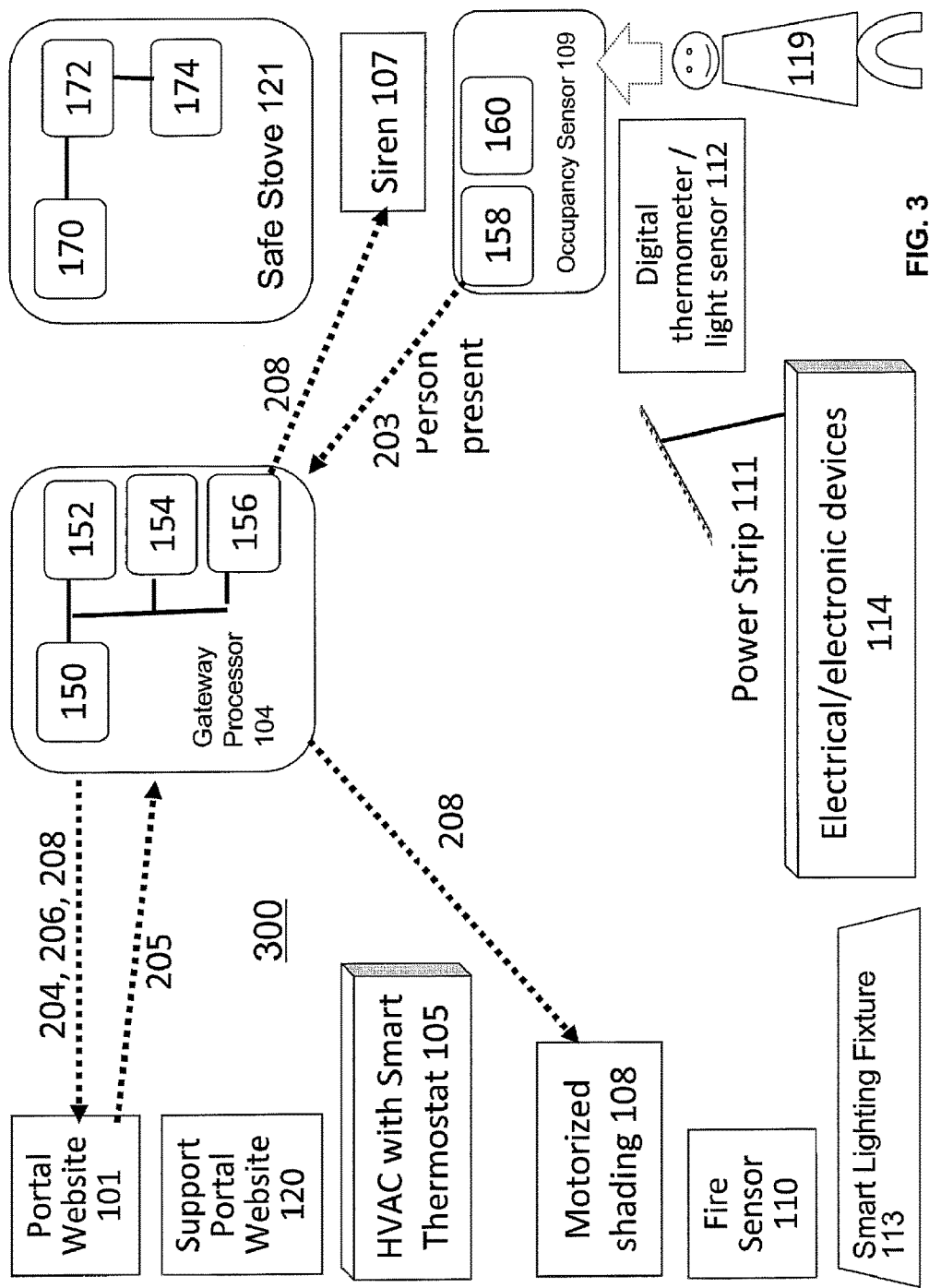
FIG. 3 illustrates a method of detecting an unexpected event according to some embodiments.

FIG. 3 shows a method 300 to automatically assist the authorities and the user, and to deter nonusers, for property security according to some embodiments. The method 300 includes detecting the presence of a person, consulting the user's calendar, schedule, or any other type of application or mechanism that tracks time, judging the person as a nonuser, alerting or otherwise assisting the authorities and the user, and deterring nonusers. In some embodiments, the method is referred as Unexpected Method. When detecting the change from absence of a person from a property to presence of a person 119 to the property, the occupancy sensor 109 is able to immediately send a Person Present message 203 to the gateway processor 104. Then the gateway processor 104 is able to send a Schedule Request command 204 to the calendar/schedule portal website 101, in order to determine whether the user is expected to be at the property at a given time. The occupancy sensor 109 is able to compute the latest schedule based on the corresponding response 205 from the calendar/schedule portal website 101, its local information, or both.

Based on the resulted latest schedule, the gateway processor 104 is able to judge that the user is not expected to be present in the property according to the user's schedule, set up a timer with predetermined delay, and request the person present in the property to provide a password within the specified time period. The gateway processor 104 is able to generate an audio signal with the buzzer or beeper. The gateway processor 104 is able to send an Unscheduled Entry alert 206 to the user by voice, electronic mail, text message or any combinations thereof, and provide the user registered street address or physical location. By doing so, the system is able to determine if the person present in the property is indeed the user. This is able to result if the user failed to update his or her calendar or schedule or did not maintain a computer-readable calendar or schedule. In an example when the person 119 failed to enter a correct password before timeout or if the gateway processor 104 does not receive a correct password before the timer elapses, the gateway processor 104 is able to immediately notify the authorities and/or the user with the user registered street address or physical location of the property by one or more phone calls, messages, emails, or any other type of communication means. The gateway processor 104 is also able to send an Invasion Alarm 208 to the siren 107 and the smart motorized shading (blinds or drapery) 108.

To deter the unauthorized person 119 (FIG. 3), upon receiving the Invasion Alarm 208, the siren 107 is able to sound. To assist the authorities, the smart motorized shading 108 is able to open up or otherwise move the blinds or drapery, such that the interior of the property is able to be seen from the exterior of the property via the windows of the property, in order to permit authorities to view the property from outside. This alarm condition is able to continue until the user returns and enters the correct password.

The gateway processor 104 is able to record all the related events with timestamps to assist any follow-up investigations and is able to send a copy of the record to a support portal website 120 for off-site backup. The above automatic procedure Unexpected Method is able to assist the authorities and the user and is able to deter nonusers, without the need for the user to arm an alarm, to disarm an alarm or to maintain additional calendar or schedule. The user is able to elect to disable this method, without impairing the functionality of the system, especially when the user wishes neither to maintain any computer-readable schedule nor to remember any password.

Figure 4:
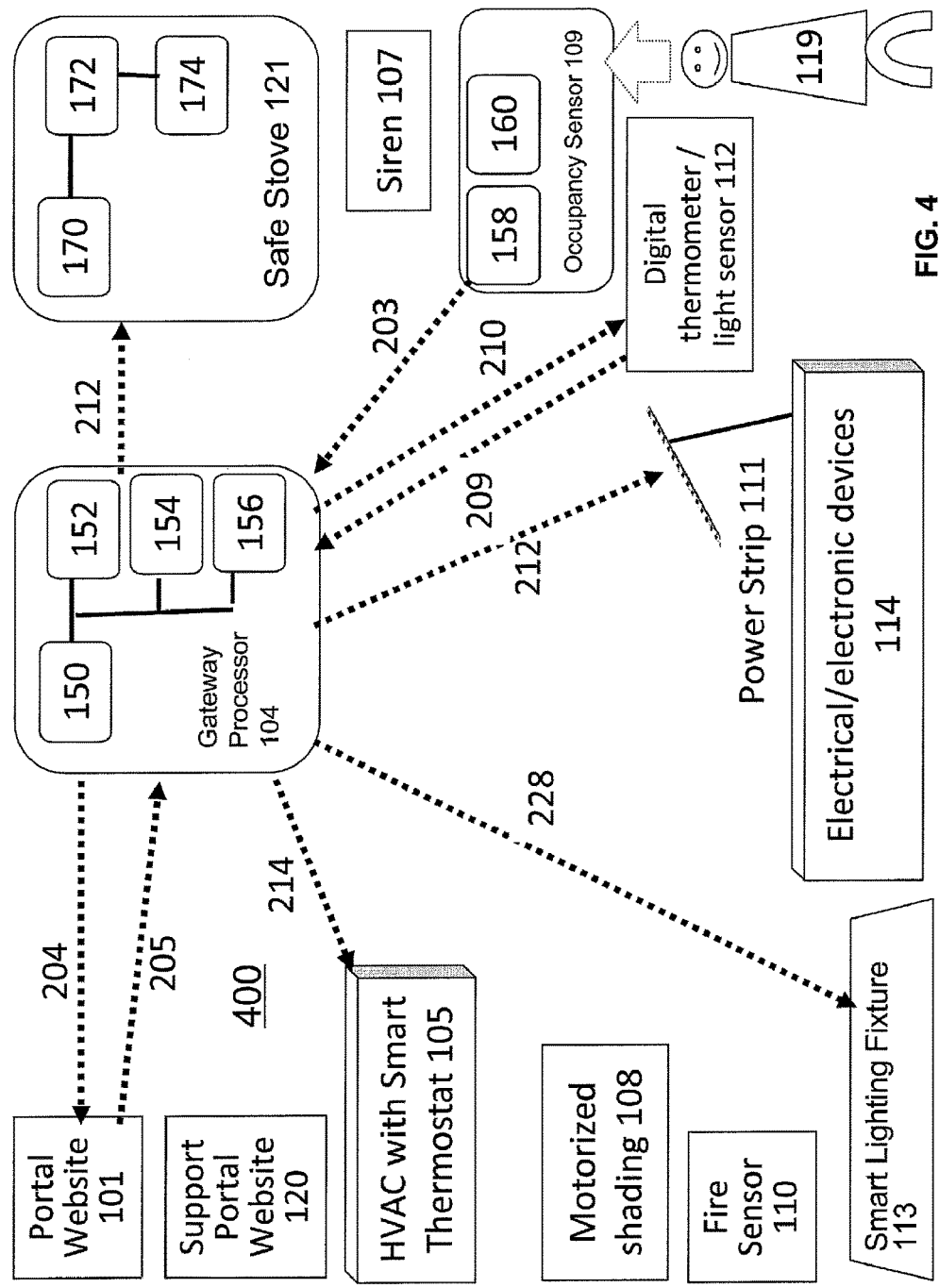
FIG. 4 illustrates a method of enabling an appliance according to some embodiments.

FIG. 4 shows a method 400 of automatically returning the appliances to their normal states and become responsive to usual operations for the convenience of users in accordance with some embodiments. The method 400 is able to judge the detected person as the user, to access environmental sensors, to manage appliances accordingly and automatically for the user's comfort, needs, profile, data or instructions using preprogramming or profiling mechanisms, according to some embodiments. In some embodiments, the method is referred as On Method.

When detecting the change from absence of a person in a property to presence of a person 119 in the property, the occupancy sensor 109 is able to immediately send a Person Present message 203 to the gateway processor 104.

If the above Unexpected Method is not disabled by the user, the gateway processor 104 is able to send a Schedule Request command 204 to the calendar/schedule portal website 101, in order to determine whether the user is expected to be at the property at a given time. The gateway processor 104 is able to compute the latest schedule based on the corresponding response 205 from the calendar/schedule portal website 101, its local information, or both. In this case, the user is expected to be present in the property according to the user's schedule. Thus, the gateway processor 104 is able to judge the person as the user and is able to automatically send a Supply Power message 212 to the power source 111 and the safe stove 121.

If the above Unexpected Method is disabled, the gateway processor 104 is able to directly send a Supply Power message 212 to the power source 111 and the safe stove 121. Upon receiving the message 212, the power source 111 is able to supply electricity to the set of devices 114. The set of devices 114 returns to standby from powered down and is then ready to respond immediately to any actuations by the user.

Additionally, the gateway processor 104 is able to send a Read Environment command 210 to the digital thermometer and light sensor 112. Based on the received temperature and illumination data 209, the gateway processor 104 is able to send a Temperature Adjustment command 214 to the smart thermostat (part of 105) to turn on the air conditioner or the heater based on the temperature of user's preference. Based on the received temperature and illumination data 209, the gateway processor 104 is able to separately send a Brightness Request command 228 to the smart lighting fixture 113, specifying a certain percentage of full brightness of the illumination, such as 100%, 70%, 50%, and 0%.

Upon receiving the message 212, the safe stove 121 is able to close the switch and have the user-controlled heating or cooking element return from powered down to functional and responsive to user controls.

The above (On Method) is able to automatically return the appliances back to normal, thereby causing the appliances to be ready to respond to the user, and also to manage the lighting, temperature and other environmental conditions for the user. The user is able to elect to disable this method, without impairing the functionality of the system, especially when the user has already disabled the Off Method.

Figure 5:
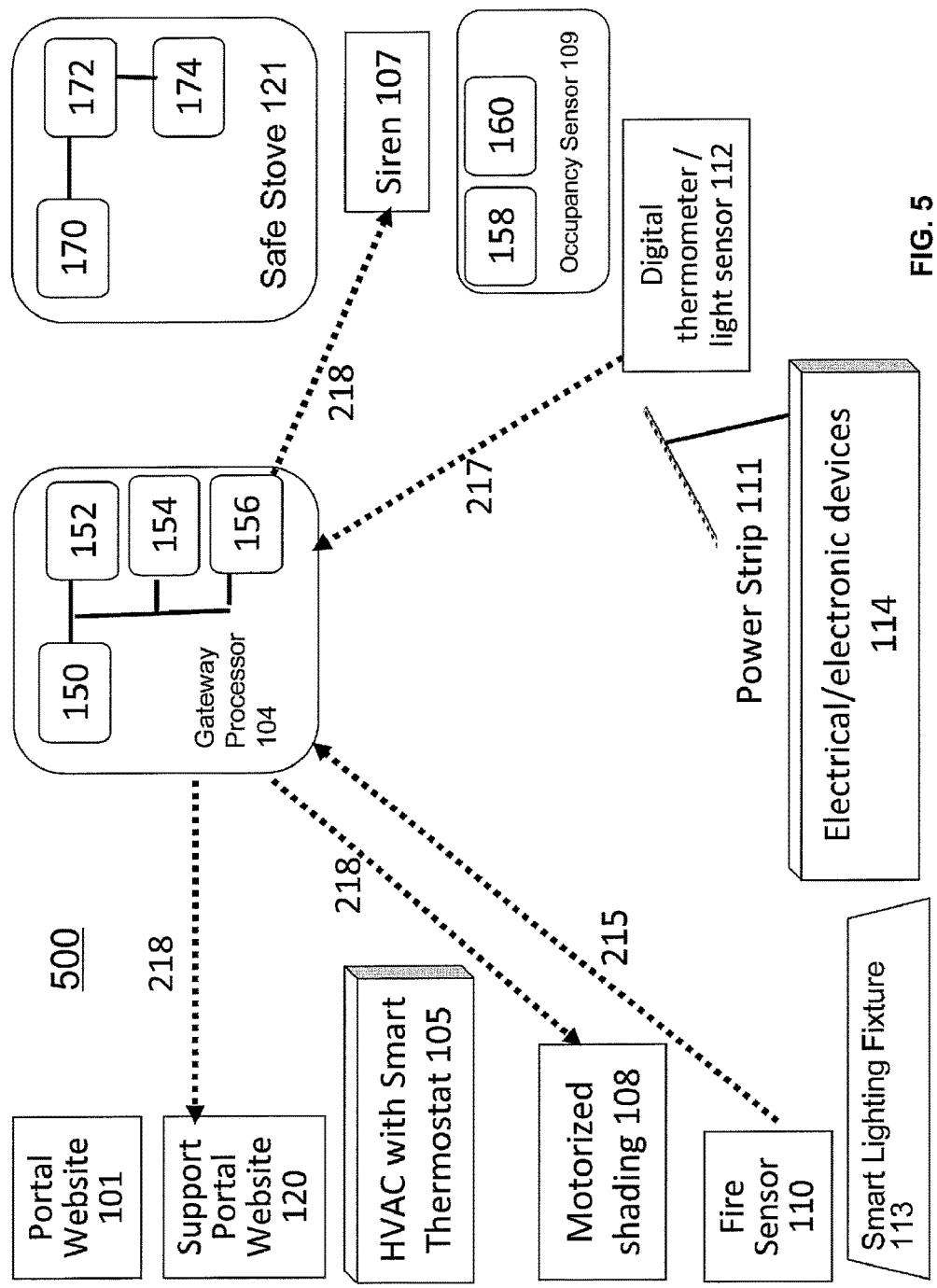
FIG. 5 illustrates a method of sensing and warning of a hazardous situation according to some embodiments.

FIG. 5 shows a method 500 of sensing a fire using redundancy or backup operations, to alert the fire department and the user automatically and to assist the authorities, regardless of the location of the user in accordance with some embodiments.

In some embodiments, the method 500 comprises sensing a fire using redundancy or backup operations, to alert the fire department and the user, to alert or otherwise assist the authorities, regardless of the user's location, according to some embodiments. In some embodiments, the method 500 is referred as Alarm Method. The disclosed methods/devices are able to perform redundancy or backup operations to detect fire dangers by checking all suitable sensors just in case any of those sensors fails to detect a fire.

As soon as the smoke and carbon monoxide sensor 110 detects smoke, the sensor 110 is able to send a Smoke Alert 215 to the gateway processor 104. At the same time, the thermometer and light sensor 112 is able to separately send an Extreme Temperature alert 217 with the temperature data to the gateway processor 104. Upon receiving only the earlier one of the two alerts 215 and 217, the gateway processor 104 is able to send a Fire Alarm 218 immediately to the siren 107 and the motorized shading 108. The gateway processor 104 is able to immediately call the fire department and the user and provide the registered user street address or physical location of the property.

The siren 107 is able to sound an alarm to draw attentions, and the motorized shading 108 is able to open the shading to allow the authorities to see through the window.

The gateway processor 104 is able to record all the related events with timestamps to assist any follow-up investigations and is able to send a copy of the record to a support portal website 120 for off-site backup.

The above Alarm Method is able to utilize all available sensors to detect fire, in terms of smoke, carbon monoxide, illumination, temperature or other substances or radiations from a flame, and alert the authorities and the user with all available means, including phone calls, siren and other means, regardless of the location of the user. The Alarm Method is also able to assist the authorities on any follow-up investigation with recorded data. The user is able to elect to disable this method, without impairing the functionality of the system, especially when the user wishes to use another emergency system.

If there are no sensors on the LAN suitable to detect substances or radiations from a flame, the fire detection service is able to pause until such a sensor become available. Once a sensor is added into the system, the sensor is able to automatically identify itself to the gateway processor 104. The gateway processor 104 is then able to continue the fire detection service. The technology (e.g. the system 100) is applicable but not limited to the availability of such a sensor, the fire detection service, or both.

Figure 6:
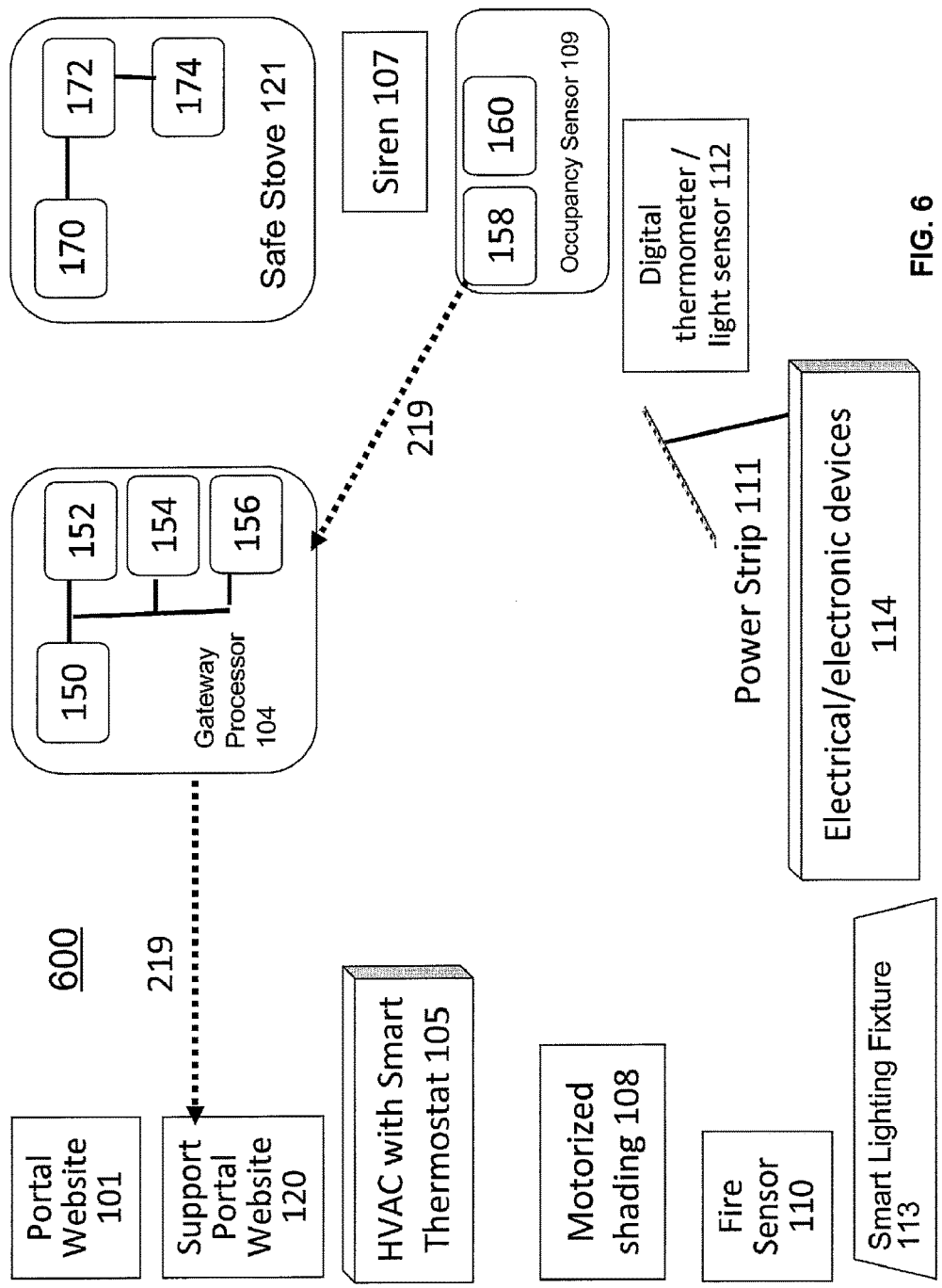
FIG. 6 illustrates a method of sensing a low battery situation according to some embodiments.

FIG. 6 shows a method 600 of assisting the user to replace an exhausted battery in a node of the network in accordance with some embodiments. In some embodiments, the method 600 comprises sensing a low battery situation, and advising the user which battery to change. In some embodiments, the method is referred as Battery Method.

In some embodiments, both the occupancy sensor 109 and the thermometer and light sensor 112 are battery powered. As the battery for occupancy sensor is expiring (voltage level has decreased), the occupancy sensor 109 is able to set up a recurring timer to send a periodical Low Battery warning 219 to the gateway processor 104. A unique identifier of the particular occupancy sensor, such as a data link layer address, is able to be included as part of the warning 219. Any type of identifier or designation is within the scope of embodiments contemplated herein.

The gateway processor 104 is able to translate the unique device identifier into user-understandable device name and/or location, and forward the Low Battery warning 219 to the user. The user is able to replace battery for the occupancy sensor 109 based on the device name and/or location included in the voice, electronic mail, or text message. Thus in some embodiments, the user does not have to identify which node is having the low battery condition in a system wherein multiple battery-powered nodes are used.

As soon as a new battery is installed, the occupancy sensor 109 is able to cancel the recurring timer and stop sending the Low Battery warning 219 to the gateway processor 104. The user is able to no longer receive the forwarded message 219.

The above Battery Method is able to help the user to identify which battery to be replaced. The user is able to elect to disable this method, without impairing the inventive system, especially when the user wants to periodically replace the batteries before expiration.

The user is able to access the system disclosed herein from any internet-enabled computing devices with virtual or physical user input/output interface, such as a personal computer, smart phone, digital assistant, or a combination thereof. The gateway processor 104 is also able to comprise a virtual or physical user input/output interface to be used as the user interface during registration, setup procedure, password entry, or other situations.

The gateway processor 104 is able to store default settings, like the highest temperature before fire alarm, lowest temperature before water pipes freeze, and any other default settings to minimize setup procedure. The gateway processor 104 is also able to store program and/or other computer-readable data to assist the user to register and to setup the system 100 with a support portal website 120.

During the registration or setup procedure, the user is able to specify unique account name/password combination(s) to allow one or more users to access the technology system. The user is able to provide information to enable the technology to access the user's computer-readable calendar(s), schedule(s) or other information stored on the calendar/schedule portal website 101. The user is also able to enter the street address or physical location of the deployed location to allow the technology to provide the address or physical location to the authorities and the user upon fire emergencies, unauthorized entries or other events. The user is able to enter temperature, illumination or other preferences for automated environmental controls or is able to have the technology to profile the existing environmental conditions in order to generate the preferences. The user is able to elect to have the fire hazard reduction, fire hazard detection, energy management, property security, or any combinations thereof provided by the system 100 and/or the methods described herein. The system 100 is able to store those user information and elections in the support portal website 120, the calendar/schedule portal website 101, the gateway processor 104, or any combination thereof.

The devices and methods disclosed herein are applicable but not limited to the use of the internet 102. If there is no internet 102 connection, the system is still able to perform fire prevention, fire detection, energy management, property security, or any combination thereof.

Figure 7:
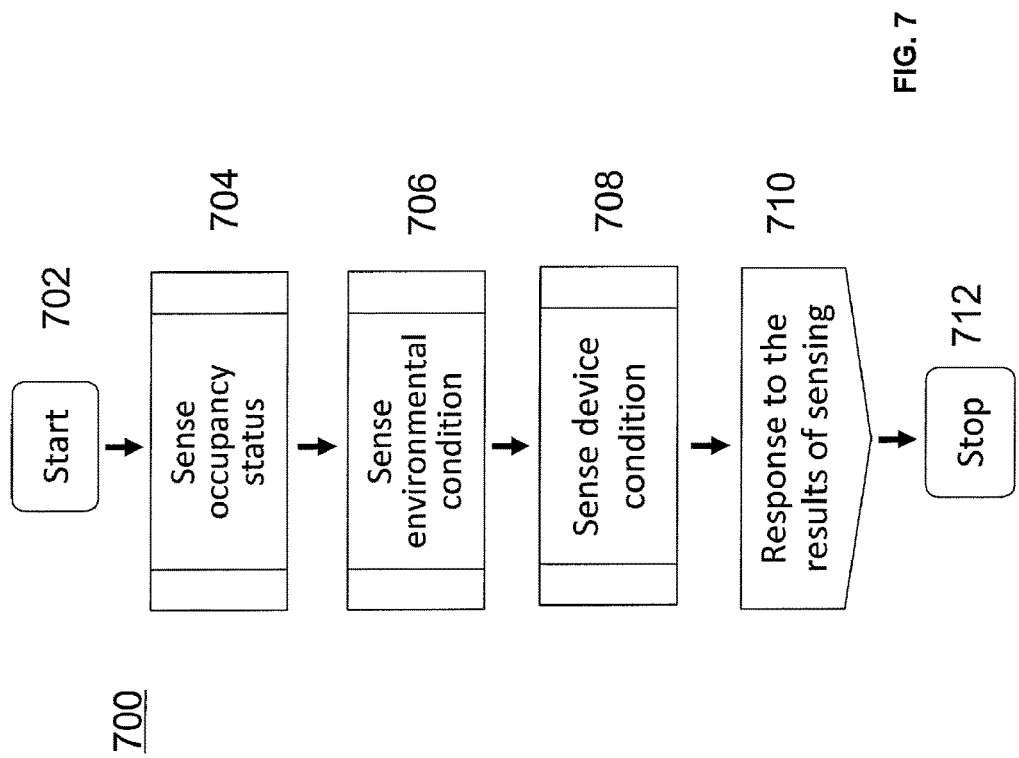
FIG. 7 illustrates a flowchart of a method of using the energy management, property security and fire hazard prevention system/device according to some embodiments.

FIG. 7 illustrates a flowchart of a method 700 of using the energy management, property security and fire hazard prevention system/device in accordance with some embodiments. The method 700 is able to begin in Step 702. In Step 704, occupancy status of a pre-selected property is sensed. Sensing of the occupancy status is able to be performed using any sensors capable of sensing the presence of human beings or animals, such as motion sensors and/or ultrasonic sensors. When the sensor senses the presence of a human being or an animal, the system 100 (FIG. 1) is able to determine that the occupancy status is positive. When the sensor senses the absence of a human being or an animal, the system 100 is able to determine that the occupancy status is negative. At step 706, one or more environmental conditions are able to be sensed. Any sensors are able to be selected to be used for sensing. For example, if an environmental condition to be sensed is fire, a fire sensor is able to be used. The fire sensor is able to sense one or more characteristics of a flame, such as carbon dioxide, carbon monoxide, temperature, and/or smoke. At Step 708, one or more device conditions are able to be sensed. Any sensors are able to be selected to be used for sensing. For example, if the battery power is to be checked, a voltage sensor is able to be used. At Step 710, the results of the sensing described above are responded. For example, when the occupancy status is determined to be negative, the system 100 is able to cut-off power supply or to lower the power supply to the appliance. When the environmental condition sensor senses hazardous condition occurring in/near the property, the system 100 is able to send out notification or warnings. When the device condition sensor senses low in battery power, the system 100 is able to notify the user to change the batteries. In Step 712, the method is able to be stopped.

The devices and methods disclosed herein are applicable to but not limited by the devices illustrated in the above examples. The system is expandable and is able to have more or less nodes in the networks. Further, a node in the system is able to be an integration of one or more devices illustrated above.

The devices and methods disclosed herein are applicable to but not limited by systems for fire hazard avoidance, fire hazard detection, energy management, property security, or any combination thereof.

The devices and methods disclosed herein are able to utilize but not limited by a locating engine, which is able to associate a node of the LAN(s) with one or more occupancy sensors 109 in a system with a plurality of other occupancy sensors 109. A node is able to be associated with one or more occupancy sensors 109 when they are physically located in the same area in the property. Based on the location association information, the system is able to perform "fine-grained" services, which enable, disable or adjust appliances or equipment for each area separately and depending on whether a user is present in the area. "Coarse-grained" services are able to enable, disable or adjust appliances or equipment in the property as a whole depending on whether a user is present in the property. The devices and methods disclosed herein are applicable but not limited to fine-grained, coarse-grained services or any combinations thereof. The term "withdraw" energy used herein is able to include reduce, control, stop, and halt energy supply. The property disclosed herein is able to include any properties including cars, factories, warehouse, and banks.

Some of the above-described functions are able to be composed of instructions that are stored on storage media (e.g., computer-readable medium). The instructions are able to be retrieved and executed by the processor. Some examples of storage media are volatile or non-volatile memory devices, tapes, disks, and the like. The instructions are operational when executed by the processor to direct the processor to operate in accord with the invention.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution and/or in providing space to a CPU for storage. Such media are able to take many forms, including, but not limited to, non-volatile media, volatile media and transmission media. Non-volatile media comprise, for example, flash memory, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media are also able to take the form of acoustic or light waves, such as those generated during radio frequency (RF) and infrared (IR) data communications.

To utilize the systems and devices for and methods of energy management, property security and fire hazard prevention, a user is able to initiate the system when he/she leaves the property, set a schedule for a timed, regular, or recurring performance, or allow the system to automatically initiate itself at a predetermined condition, such as upon detecting the entrance of a human or animal.

In operation, one or more occupancy sensors monitor the presence of humans or animals in a property and send the information of the monitoring to a processing unit. The processing unit processes the information to determine the occupancy status of the property and send the data processed to be stored, to generate notification information, or to generate a control signal to control/regulate the power of one or more appliance, such as cooking devices and/or electronic equipments.

The above description is illustrative and not restrictive. Many variations of the invention will become apparent to those of skill in the art upon review of this disclosure. The scope of the invention should, therefore, be determined not with reference to the above description only, but instead should be determined with reference to the appended claims along with their full scope of equivalents.

It will be further understood that the methods of the invention are not necessarily limited to the discrete steps or the order of the steps described. To the contrary, the present descriptions are intended to cover such alternatives, modifications, and equivalents as can be included within the spirit and scope of the invention as defined by the appended claims and otherwise appreciated by one of ordinary skill in the art.

What is claimed is:

1. A computer implemented method in a gateway processor for automatically controlling appliances in a property:
    detecting an absence of any person on the property by at least one occupancy sensor, the at least one occupancy sensor being communicatively coupled to the gateway processor;
    responsive to the detected absence, disabling operation of one or more appliances, the one or more appliances being communicatively coupled to the gateway processor;
    detecting a change from the absence of any person to a presence of at least one person in the property as determined by the at least one occupancy sensor;
    accessing at least one computer readable calendar of at least one user based upon the detected change by the gateway processor, wherein the at least one user comprises an individual or group of individuals who have the right to access the property;
    determining by the gateway processor whether one of the at least one user is expected to access the property based upon the at least one computer readable calendar, wherein when no user is expected based upon the computer readable calendar a detected person is determined as an unexpected person; and
    enabling operation of the one or more appliances by the gateway processor responsive to one of the at least one computer readable calendar indicating one of the at least one user is expected.

2. The computer implemented method of claim 1, further comprising a step of:
    using machine learning to generate a computer readable calendar for the at least one user.

3. The computer implemented method of claim 1, wherein the disabling and enabling appliances comprising managing all of the appliances together.

4. The computer implemented method of claim 1, wherein the disabling and enabling appliances comprising managing each appliance individually based upon a location of each appliance.

5. The computer implemented method of claim 1, further comprising a step of:
    pre-profiling an environmental condition to generate a preference as a base for the appliance management.

6. The system of claim 1, wherein the at least one occupancy sensor is affixed within the property.

7. The system of claim 1, wherein the at least one occupancy sensor comprises two or more occupancy sensors.

8. The system of claim 1, wherein the at least one occupancy sensor shares a housing with the gateway processor.

9. The system of claim 1, wherein the at least one occupancy sensor communicatively couples to a local access network in common with the gateway processor.

10. A system for automatically controlling appliances in a property, the system comprising:
- at least one occupancy sensor-a; and
- a gateway processor for receiving signals from the at least one occupancy sensor-a and being communicatively coupled to one or more appliances, the gateway processor including a mechanism to:
  - detect an absence of any person on the property by the at least one occupancy sensor;
  - responsive to the detected absence, disabling operations of the one or more appliances;
  - detect a change from an absence of a person to a presence of at least one person in the property using the at least one occupancy sensor;
  - access at least one computer readable calendar of at least one user based upon the detected change, wherein the at least one user comprises an individual or group of individuals who have the rights to access the property;
  - determine whether one of the at least one user is expected to be at the property based upon the at least one computer readable calendar, wherein when no user is expected based upon the computer readable calendar a detected person is determined as an unexpected person; and
  - enabling operation of the one or more appliances if one of the at least one computer readable calendar indicates that one of the at least one user is expected.

11. The system of claim 10, wherein the gateway processor creates a computer readable calendar for the at least one user using machine learning.

12. The system of claim 10, wherein the gateway processor manages all of the appliances together.

13. The system of claim 10, wherein the gateway processor manages each appliance individually based upon a location of each appliance.

14. The system of claim 10, wherein the gateway processor pre-profiles an environmental condition to generate a preference as a base for the appliance management.

* * * * *